United States Patent [19]
Corey et al.

[11] Patent Number: 5,674,005
[45] Date of Patent: Oct. 7, 1997

[54] COMPUTER CONTROLLED FEED MIXING SYSTEM

[76] Inventors: Allen E. Corey, 337 N. Pine St., Kimberly, Wis. 54136; William R. Berghius, N8765 Mark Rd., Brillion, Wis. 54110; Thomas D. Steppert, 1041 Debra St., Wrightstown, Wis. 54180; Richard Donald Seidl, N365 Marion Ave., Appleton, Wis. 54915

[21] Appl. No.: 414,245

[22] Filed: Mar. 20, 1995

[51] Int. Cl.$^6$ ................................ B01F 15/02; A23N 17/00
[52] U.S. Cl. ..................... 366/132; 366/141; 366/152.1; 366/182.3; 366/603
[58] Field of Search ...................... 366/16–18, 141, 366/132, 151.1, 192, 152.1, 160.1, 177.1, 181.1, 181.2, 181.3, 183.1, 182.1, 182.3, 186, 603

[56] References Cited

U.S. PATENT DOCUMENTS

| | | | |
|---|---|---|---|
| 3,822,056 | 7/1974 | Hawes, Jr. et al. | 366/181.1 X |
| 4,459,028 | 7/1984 | Bruder et al. | 366/141 |
| 4,498,783 | 2/1985 | Rudolph | 366/141 X |
| 4,502,416 | 3/1985 | Keysell et al. | |
| 4,589,372 | 5/1986 | Smith | |
| 4,733,971 | 3/1988 | Pratt | |
| 5,069,165 | 12/1991 | Rousseau | |
| 5,087,128 | 2/1992 | Matthews et al. | |
| 5,105,767 | 4/1992 | Gordon et al. | |
| 5,110,521 | 5/1992 | Moller | 366/141 X |
| 5,143,289 | 9/1992 | Gresham et al. | |
| 5,240,324 | 8/1993 | Phillips et al. | 366/141 X |

FOREIGN PATENT DOCUMENTS

| | | | |
|---|---|---|---|
| 2218613 | 11/1989 | United Kingdom | 366/603 |

*Primary Examiner*—Charles E. Cooley
*Attorney, Agent, or Firm*—Wheeler Kromholz & Manion

[57] ABSTRACT

An apparatus for mixing livestock feed including a feed mixer having a filling opening and a discharge opening, a feed mixing mechanism located within the feed mixer, and a plurality of feed ingredient supply mechanisms for supplying feed ingredients. The plurality of feed ingredient supply mechanism coupled to the feed mixer via a conveyor mechanism. Each feed ingredient supply mechanism having an output and a control mechanism, each control mechanism being attached to each feed ingredient supply mechanism at the output. An electronic scale having an electronic output, the scale attached to the feed mixer. A mixed feed discharge mechanism for discharging mixed feed, the discharge mechanism attached to the feed mixer discharge opening. A programmable logic control mechanism having an information input and a plurality of command outputs, the programmable logic control mechanism programmed to independently open each control mechanism and close each control mechanism. At least one of the plurality of command outputs being connected to at least one the plurality of feed ingredient supply mechanism. At least one of the plurality of command outputs being connected to the discharge mechanism. At least one of the plurality of command outputs being connected to the mixing mechanism. The information input connected to the scale output. The programmable logic control mechanism being programmed to add a predetermined weight of at least one feed ingredient and mix the ingredient in the feed mixer. The feed ingredient supply mechanism outputs comprise at least one chute and the feed ingredient supply mechanism control mechanism comprises at least one automated silo harvester door.

3 Claims, 21 Drawing Sheets

| FIG. 23A |
| --- |
| FIG. 23B |

COMPUTER CONTROLLED FEED MIXING SYSTEM

BACKGROUND OF THE INVENTION

Preparing feed for livestock can be a very time consuming task. Commonly, the various ingredients are added one at a time into a feed mixer. A feed mixer comprises a large box-like structure having a filling opening at the top and a discharge opening at the bottom or on a side. An auger or other means for mixing the feed ingredients is contained within the structure. The auger thoroughly mixes the ingredients as they are added so that the resulting feed mixture is consistent (i.e. each serving has the same amount of ingredients).

Prior art feed mixers and mixing systems require an operator to actively participate in the mixing process. The operator's duties include adding the ingredients into the box-like structure, turning the mixing reel or auger on, allowing the added ingredients to mix, turning the auger off, adding more ingredients, cycling the mixing device again, and finally removing the mixture from the mixer.

Some ingredients for the feed mixture are stored in silos. Silos are typically tall, cylindrical structures in which feed for livestock is stored. In order to further automate the system, a computer controlled motor driven means is provided for the silo harvester door. The door must be kept closed at all times except when grain, corn, or the like is removed from the silo. If the door is left open, the contents of the silo will spoil when exposed to water, direct sunlight, snow, ice etc. By utilizing the computer controlled motor driven door opening means of the present invention, the harvester door is opened automatically opened only when it is necessary to remove contents from the silo.

It is an object of the present invention to provide a computer controlled feed mixing system which is completely automated and requires no manual labor on the part of the operator. It is a further object to provide such a system that can be programmed to provide different feed mixtures depending upon the livestock to be fed. It is yet a further object to provide a system that with the same ingredients, produces an identical mixed feed each time. It is yet a further object to provide a system that is easy to operate and that has a plurality of safety devices to determine the presence of a malfunction, shut the system down, and notify the operator of the system's malfunction.

Furthermore, it is an objective to provide at least one of the silos from which feed is withdrawn and supplied to the feed mixer with an automated means for opening and closing the silo harvester door.

SUMMARY OF THE INVENTION

The invention comprises a computer control system for running a total mix ratio (TMR) feed mixer including the automated opening and closing of silo harvester doors. The computer control system controls all aspects of feed mixing. The only input the feed mixing system requires is the amount of the ingredients to be mixed into the resulting feed. When the amounts of ingredients have been programmed into the feed mixing system, the operator needs only to press the start button for mixing to begin. A computer control unit or programmable logic controller (PLC) works in combination with the feed mixer, a scale, feed ingredient delivery tubes, and conveyors to deposit feed ingredients into hopper for proper mixing.

Some feed ingredients are stored in silos. These feed ingredients include hay, corn, and oats among others. At the base of the silo, a harvester door is provided for removing the contents of the silo. Typically, the harvester door is manually opened and closed. Our invention comprises an automated harvester door opening and closing mechanism that can be coupled to a computer control unit or PLC and automatically opened or closed.

The automatic harvester door opening and closing mechanism includes a motor coupled to a screw jack, the screw jack capable of extending and retracting from the screw jack body. The end of the screw jack is attached to a horizontal bar at its center. A pair of rods are also attached to the horizontal bar, one rod at each end of the horizontal bar. The opposite ends of each rod are each attached to a door handle. Each door handle has a lever end, a pivot point, and a cammed edge. Each handle is attached to its corresponding rod at the lever end and pivots at the pivot point. The harvester door output chute has a pair of pins, each pin attached to opposite sides of the chute. These pins ride within the cammed edge of each door handle. As each handle pivots in unison with the other handle, the harvester door swings open or closed on its hinges dependent upon the pivot direction.

The scale is attached beneath the feed mixer and measures the amount by weight of each feed ingredient that has been added to the mixture, and when the desired amount has been added, the PLC shuts down the delivery means or closes the output for the specific feed ingredient. Following that, the scale is reset automatically and a delivery tube or conveyor is readied for the next feed ingredient. The system is nearly totally automated. The opening of the harvester door, the weighing by the electronic scale, the mixing operation, the adding of ingredients, and the operation of conveyors and supply tubes are also controlled by the PLC or computer control system. During the adding of silage ingredients, such as corn silage or hay silage, the feed mixer alternates on or off in a cycle of one (1) minute on and three (3) minutes off. The mixer is engaged to move the feed evenly throughout the mixer. This is also done to move the feed ahead and to pre-mix the feed (if this is not done, the feed will build up and over flow). During the adding of water to the feed mixture, the feed mixer mixes constantly. Following the addition of the final ingredient, the mixer mixes the feed for an appropriate amount of time and then stops. A signal is then given so that the operator knows the feed is ready for distribution to the livestock.

Before and after each stage of ingredient adding, an alarm sounds to let the operator know that a new ingredient is about to be added. No supervision is required. Following the shut down of the feed mixer after full mixing of all the ingredients, the operator may control downloading of the mixed feed from the mixer hopper to smaller hoppers for transfer of the mixture to the feed area or the mixed feed may be transferred automatically through the use of a discharge conveyor. All conveyors and delivery tubes continue to run if feed ingredients are on them until they are completely empty to prevent spoilage and/or freezing.

All conveyors and delivery tubes shut down if no feed ingredient is sensed within a predetermined time. The mixer will shut down too and an alarm will sound to notify the operator of the potential problem.

The key advantage of our invention is that it does not require the operator to maintain a constant watch on the feed mixer. Furthermore, the operator is not required to manually add the necessary feed ingredients. It frees the operator to attend to other matters, such as milking. The PLC or computer control system also eliminates the need for manual weighing and loading of ingredients into the TMR mixer, thus saving time and labor.

The system also controls the barn lights and stereo. They are turned on every 4 hours for 15 minutes. This gets the cows up to feed which in turn increases the milk productivity.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
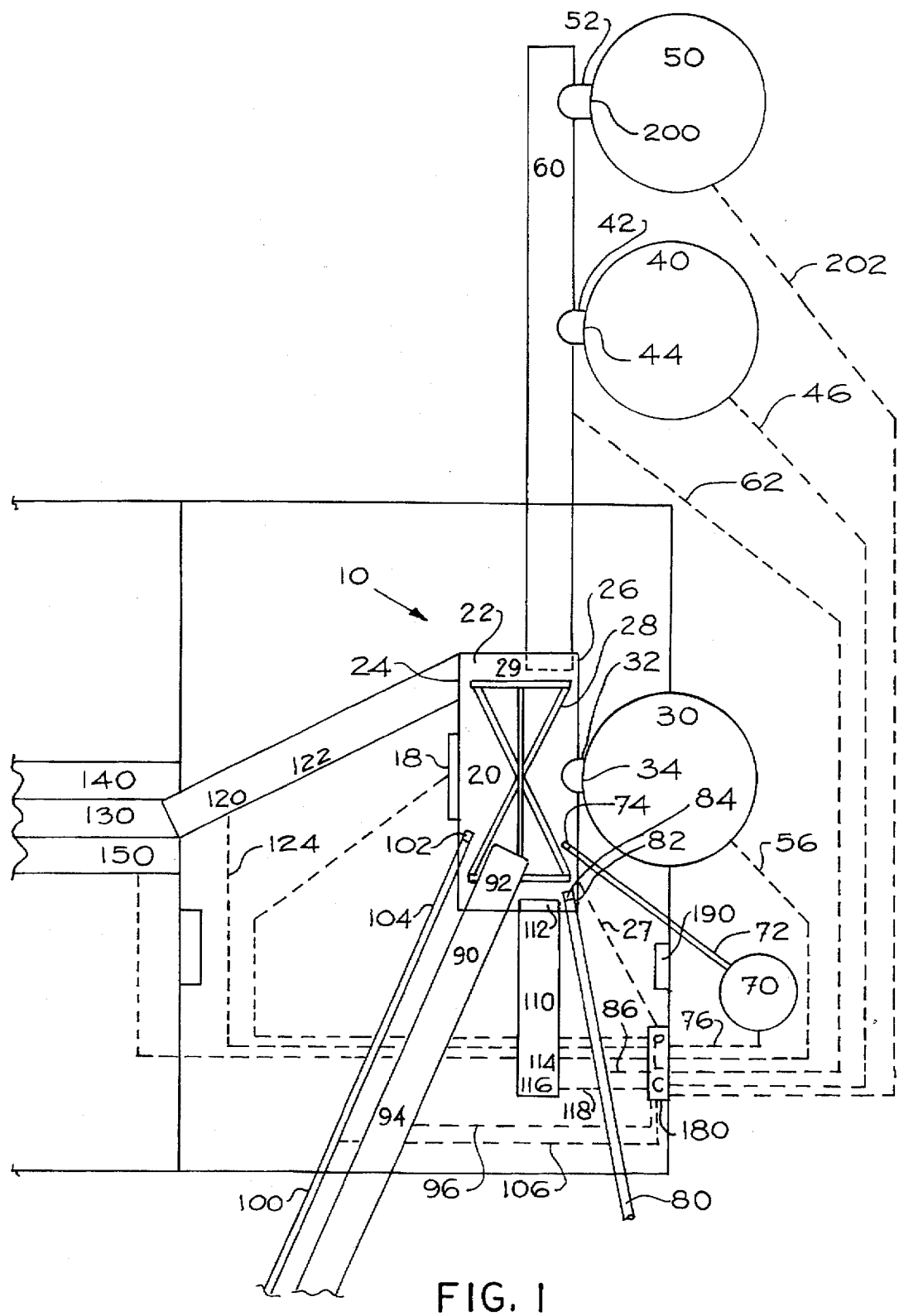
FIG. 1 is a top view of the computer controlled feed mixing system.
Figure 3:
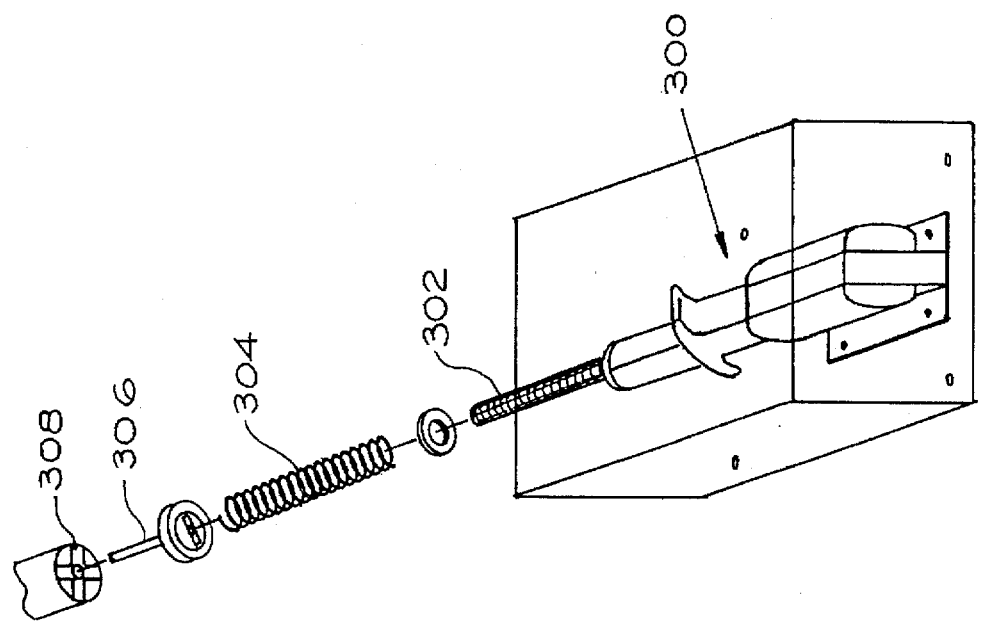
FIG. 3 is a perspective view of the harvester door opening mechanism solenoid.

The invention is best shown at 10 in FIG. 1. As can be see, the invention 10 comprises a mixer 20 having an open top 22 and a lower discharge 24. The mixer 20 comprises a box-like structure 26 within which is located a mixing auger or reel 28. The mixing reel 28 mixes the various ingredients which have been added into the structure 26.

An electronic scale 18 is located directly beneath and supports box-like structure 26. The electronic scale 18 is capable of determining the weight of the contents of the mixer 20 by means of load cells. The load cells are mounted on the floor. The mixer 20 is mounted on top of the load cells. When feed ingredients are added to the mixer 20, the load cells send a signal to the electronic scale 18. The scale 18 is programmed to a certain or predetermined weight. When the scale 18 achieves this weight, it sends a signal to a programmable logic controller (PLC) 180 which in turn shuts off the feed ingredient delivery device (silo chute, conveyor, tube, etc.). The electronic scale 18 then advances to the next feed ingredient. The PLC 180 also advances to the next ingredient.

The electronic scale 18 can be programmed for ninety nine (99) feed ingredients and eighty one (81) batches. A batch consists of one (1) to ninety nine (99) ingredients. The PLC 180 can be programmed to serve all of these commands.

Ingredients are added to the structure 26 through a plurality of mechanisms as shown in FIG. 1. The ingredients include, but are not limited to, oats, corn, hay, water, and protein. A first harvestor silo 50 containing haylage is located adjacent mixer 20 as shown in FIG. 1. A short chute or output 52 is attached to the base of the silo 50 and directs the haylage onto conveyor 60 which conveys the haylage to the mixing structure 26 of the mixer 20. An automated harvester door or control mechanism 200 opens and closes at the proper time to allow the introduction of oatlage onto the conveyor 60. The silo harvester door control mechanism 200 is controlled by the PLC 180 which sends a signal to the silo door control mechanism 200 and thus allows the required amount of ingredient to be added to the mixer. The PLC 180 is connected to the silo harvester door control mechanism 200 by means of a plurality of wires 202 which extend from the PLC 180 to the harvester door control mechanism 200.

The silo harvester door opening mechanism 200 is shown in detail in FIGS. 2 through 12. The mechanism 200 comprises a motor 210 which is coupled to a screw jack 220 at mount 226. The screw jack 220 has a screw jack body 222 and a screw jack ram 224. The screw jack ram 224 extends and retracts from the screw jack body 222 when the motor 210 is energized in a clockwise direction and counterclockwise direction respectfully. The screw jack mount 226 is connected to the ram support 230 shown in FIG. 6. The ram support 230 includes a pair of base plates 232, a pair of uprights 234 connected to base plate 232, and a top plate 236 connected to the top of the uprights 234. Finally, a pair of support arms 238 extend outward from top plate 232. Each arm 238 has an aperture 239 through which a fastener passes. The mount 226 fits between the support arms 238 and is held in place by the fastener. The ram support is permanently fixed to the silo 30 base by fasteners which pass through apertures 233 in the base plates 232.

Figure 2:
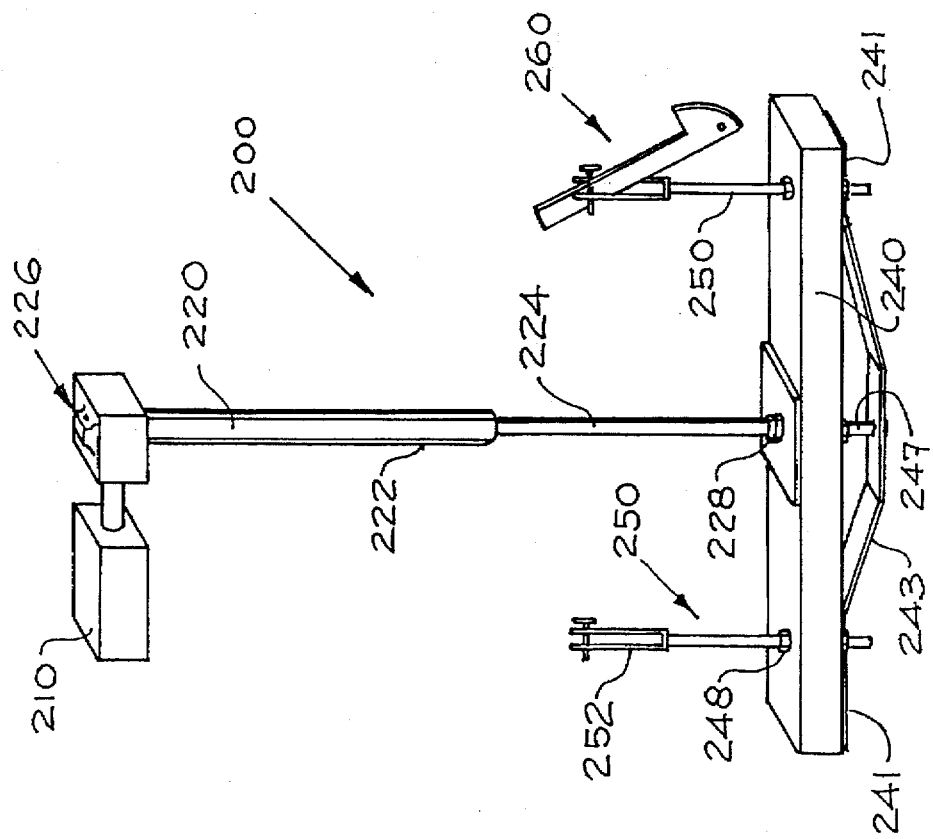
FIG. 2 is a perspective view of the harvester door opening mechanism.
Figure 7:
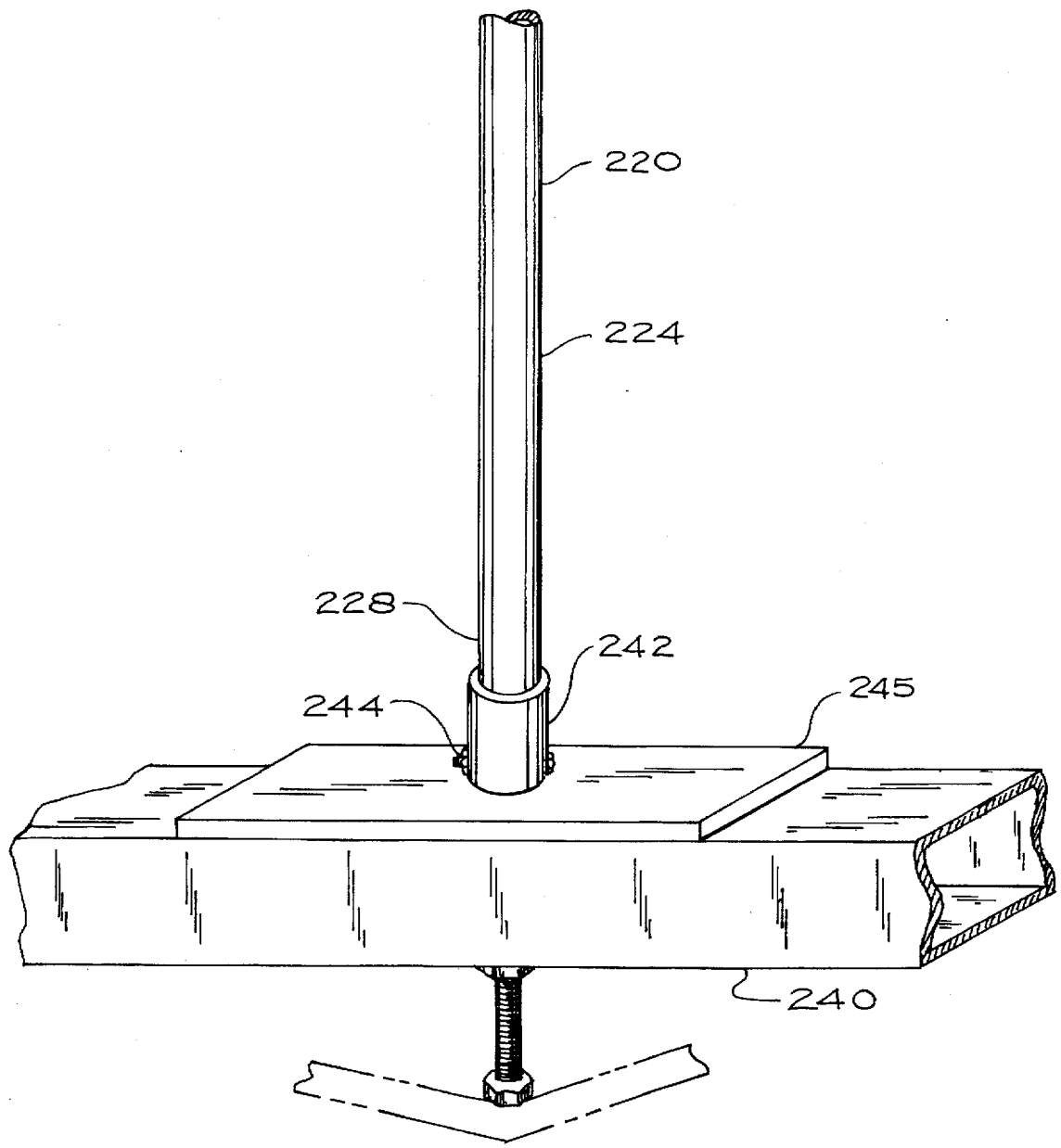
FIG. 7 is a perspective view of the ram connection.

The end 228 of the screw jack ram 224 is attached to horizontal bar 240 as shown in FIGS. 2 and 7. The screw jack ram end 228 fits into cylindrical opening 242 which is welded to plate 245 which is in turn welded to the top of horizontal bar 240. A fastener 244 passes through both the cylindrical 242 and ram end 228 to securely attach the two components together as shown in FIG. 7. Additional structural support is provided for horizontal bar 240 by support plate 241, support bar 243 and support beam 247.

Figure 8:
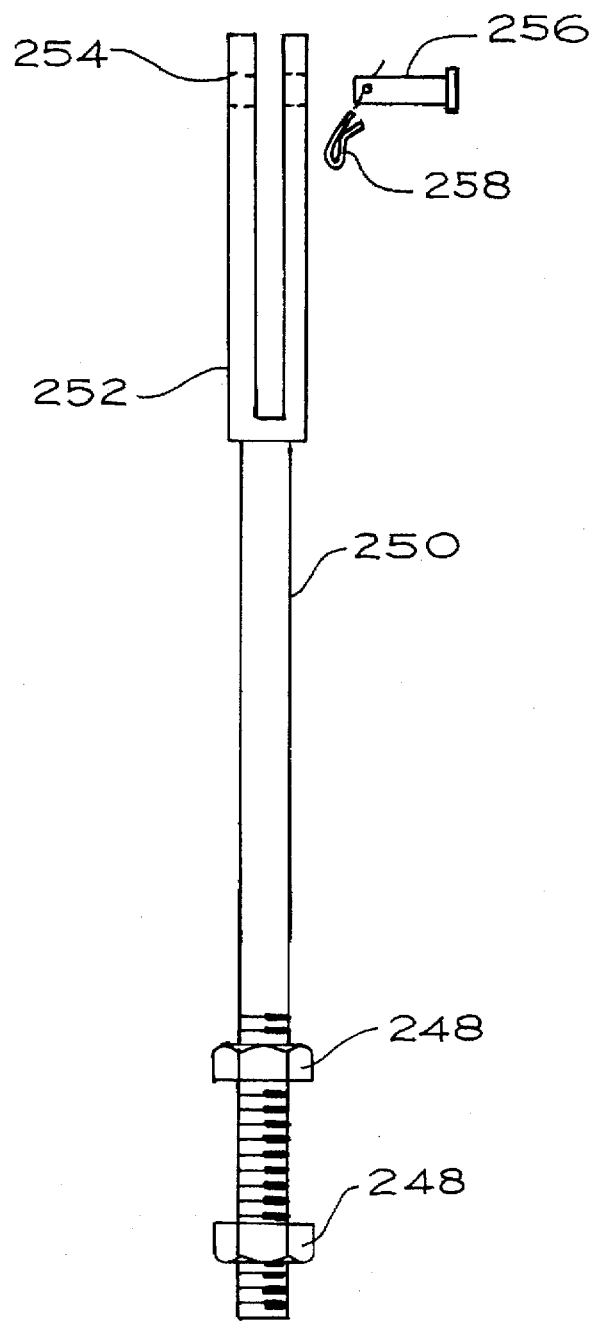
FIG. 8 is a front view of the threaded rod having a clevis.
Figure 9:
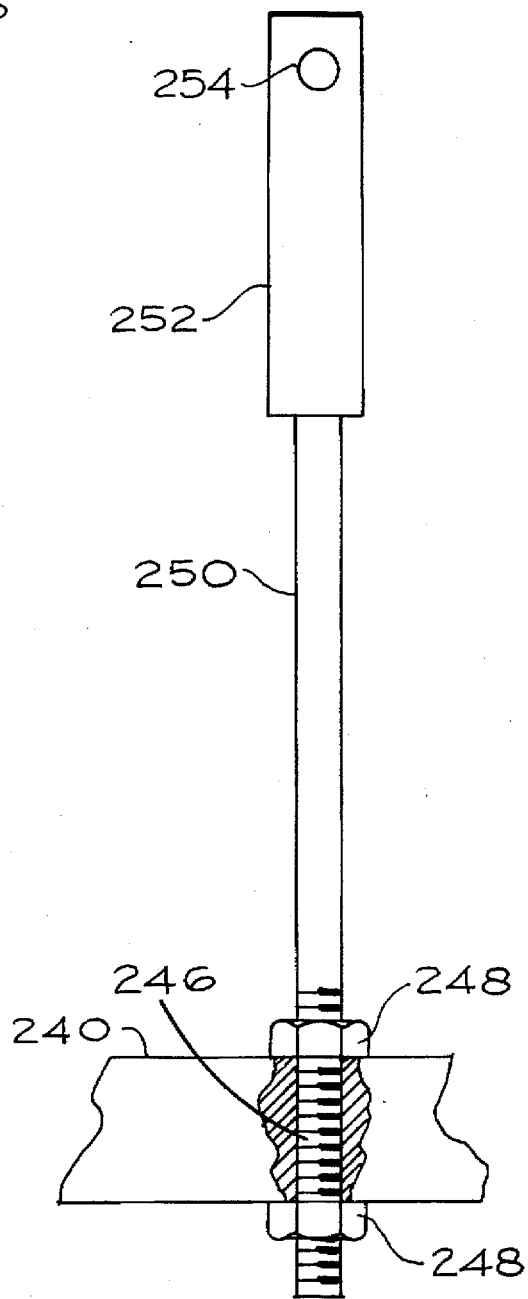
FIG. 9 is a side view of the threaded rod having a clevis.

Referring now to FIGS. 8 and 9, a pair of threaded rods 250 pass through apertures 246 near the ends of horizontal bar 240. The threaded rods 250 are held in place by nuts 248 on both the top and bottom side of the horizontal bar 240. At the opposite ends of each threaded rod 250, a clevis 252 is attached. Each clevis 252 has a pair of apertures 254 through which a pin 256 passes. The pins 256 are held in place with the aid of cotter keys 258. Pins 256 couple threaded rods 250 to the lever 262 of door handles 260.

Figure 10:
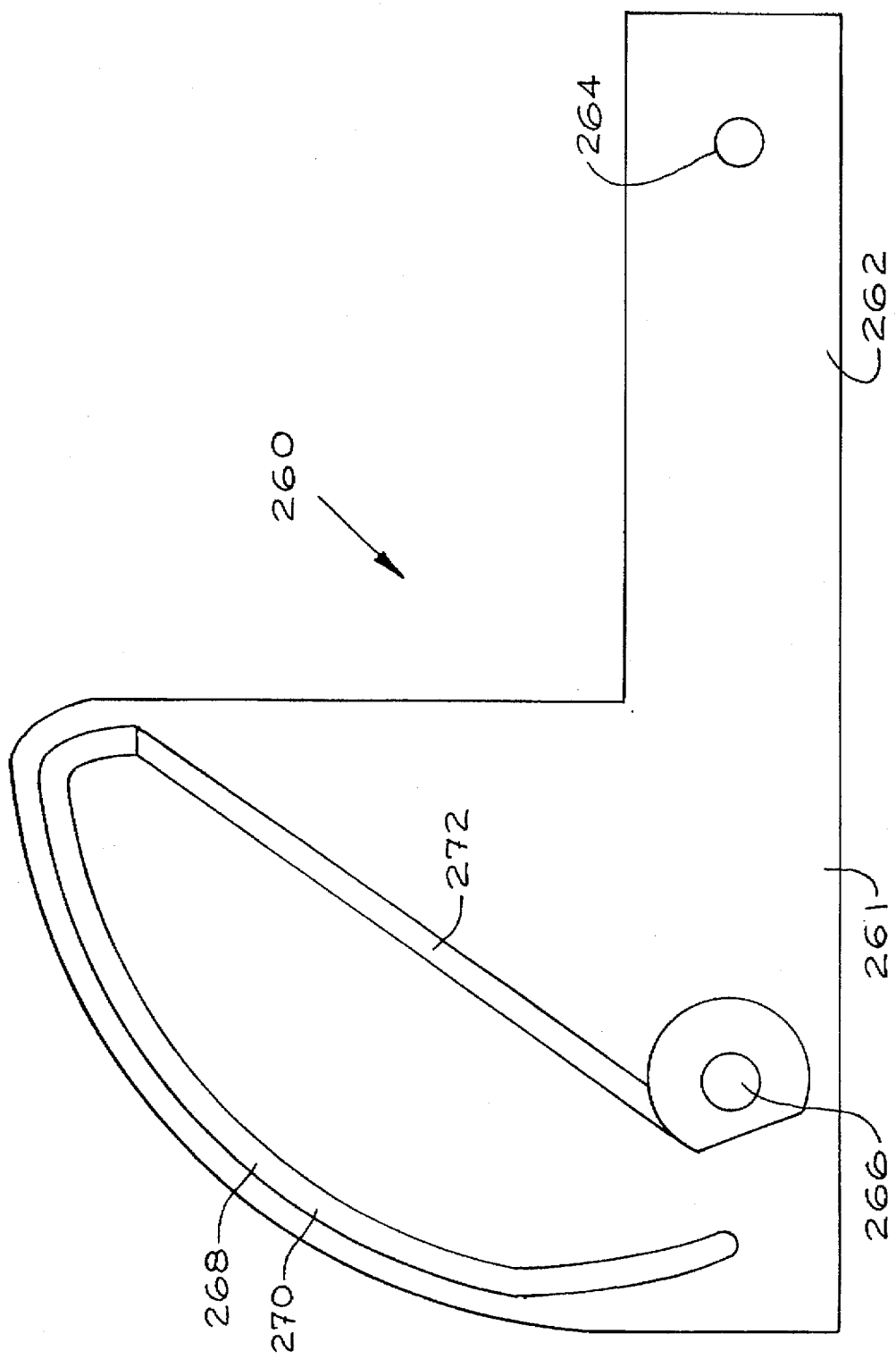
FIG. 10 is a side view of the door handle.
Figure 11:
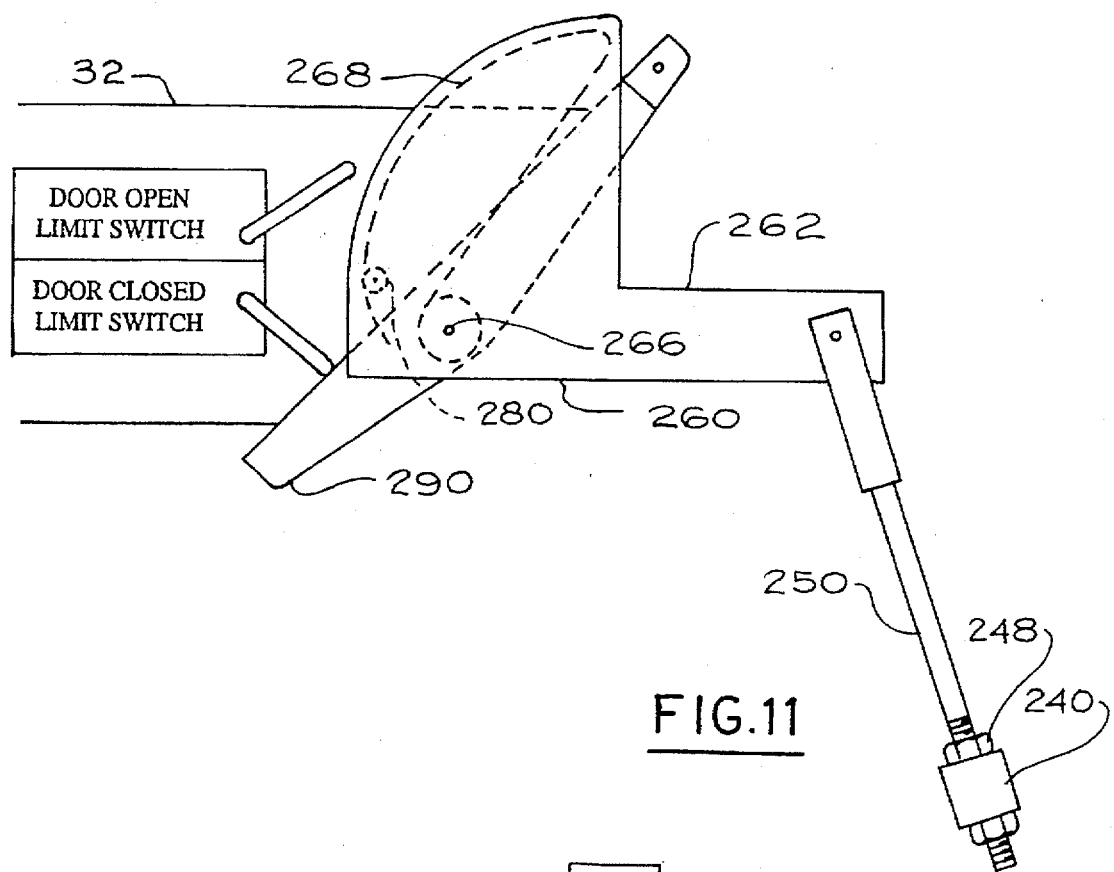
FIG. 11 is a side view of the harvester door opening mechanism showing the harvester door in a closed position.
Figure 12:
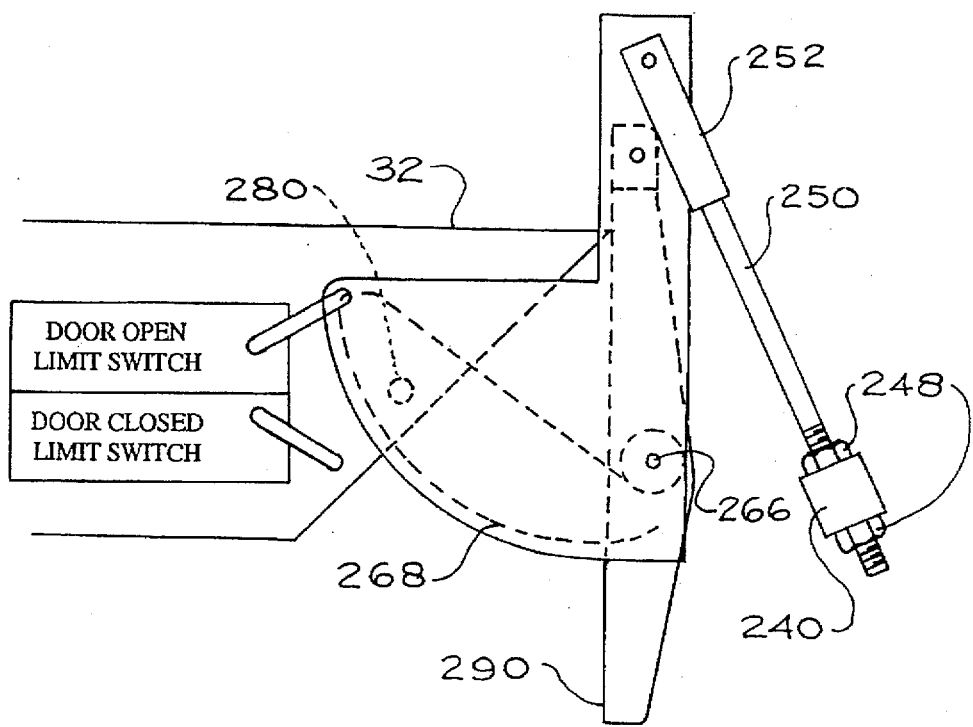
FIG. 12 is a side view of the harvester door opening mechanism showing the harvester door in an open position.
Figure 13:
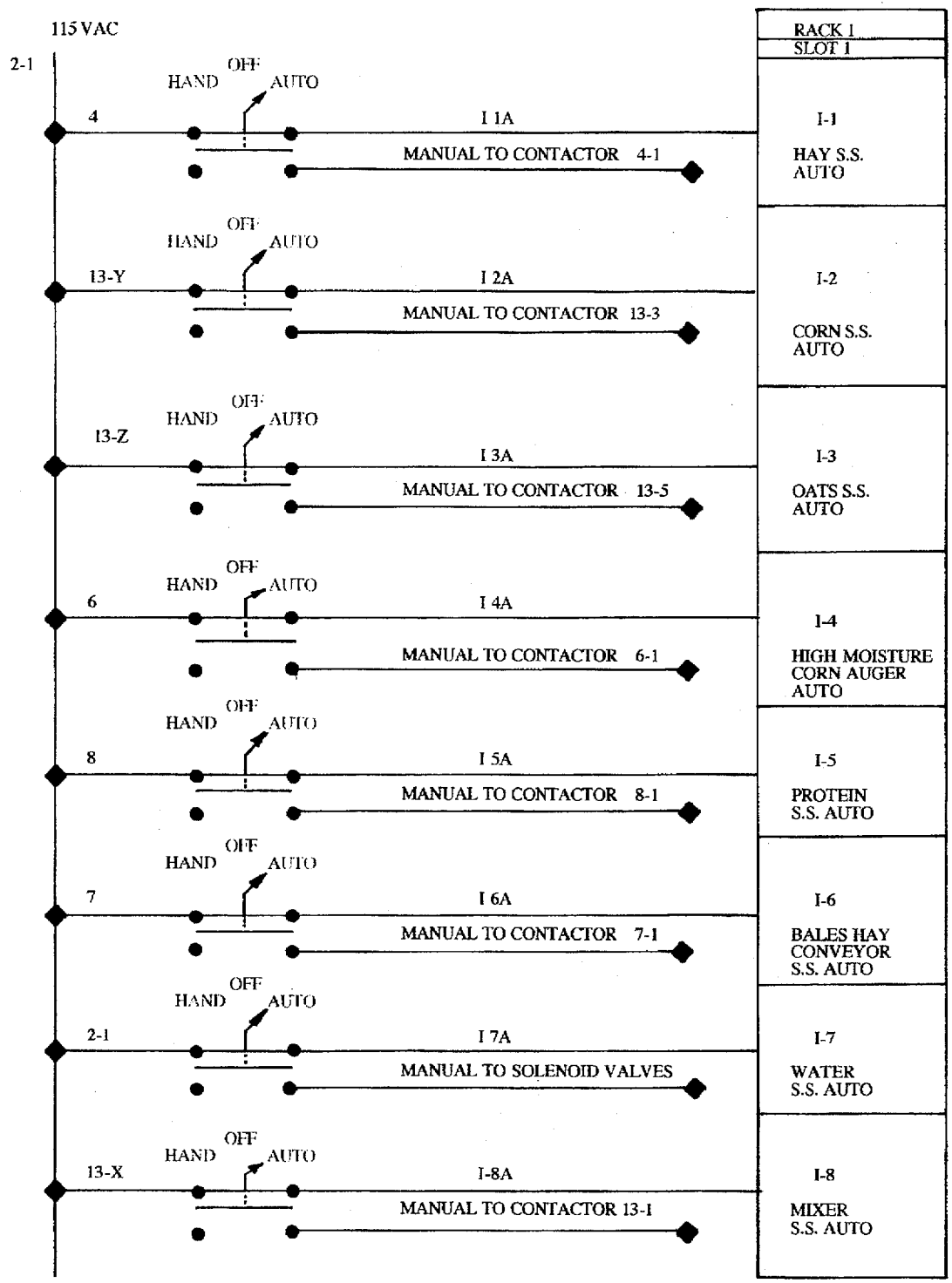
FIGS. 13–25 are electrical schematic diagrams of the circuits required for the computer controlled feed mixing system.
Figure 14:
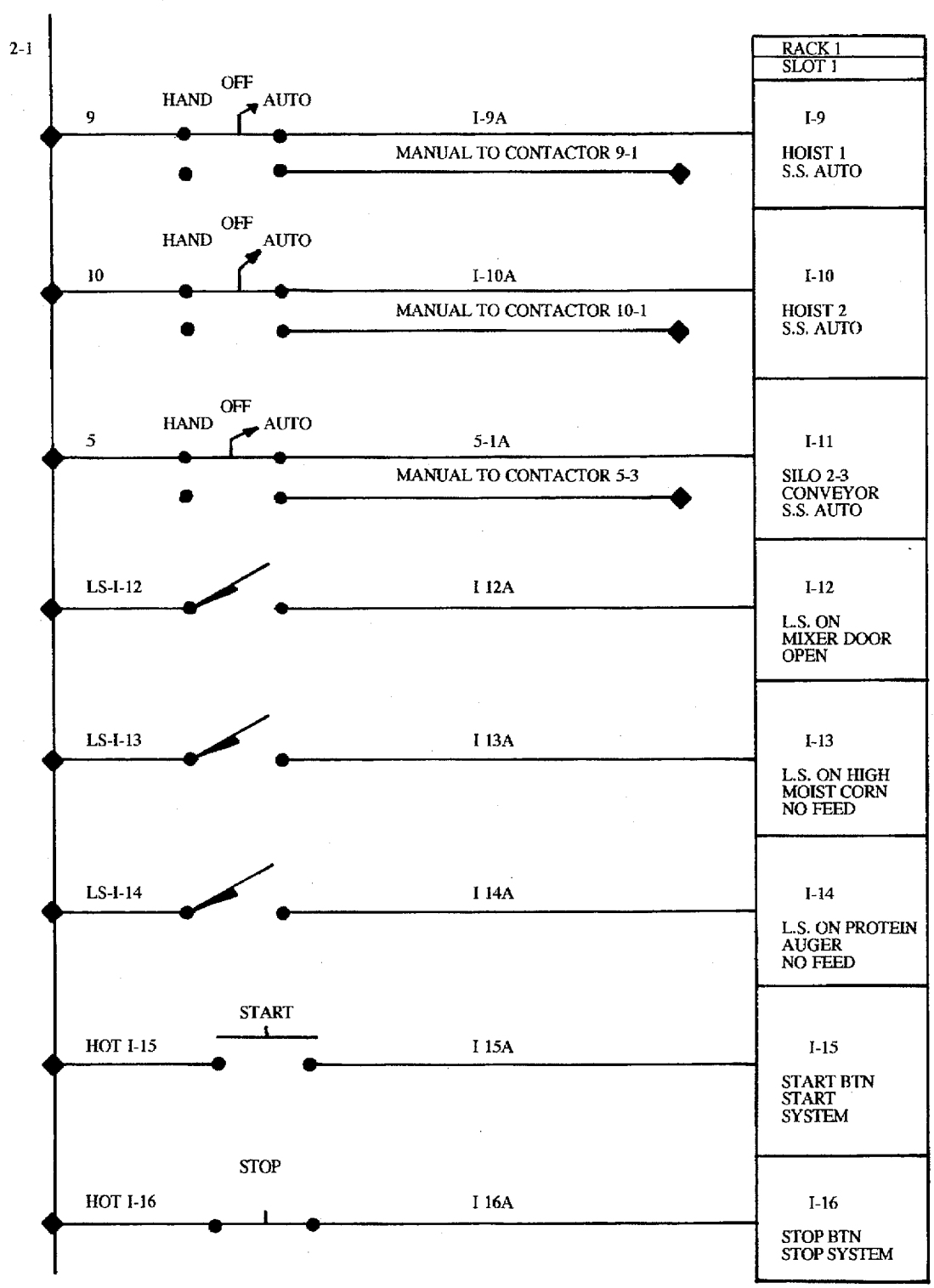
Figure 15:
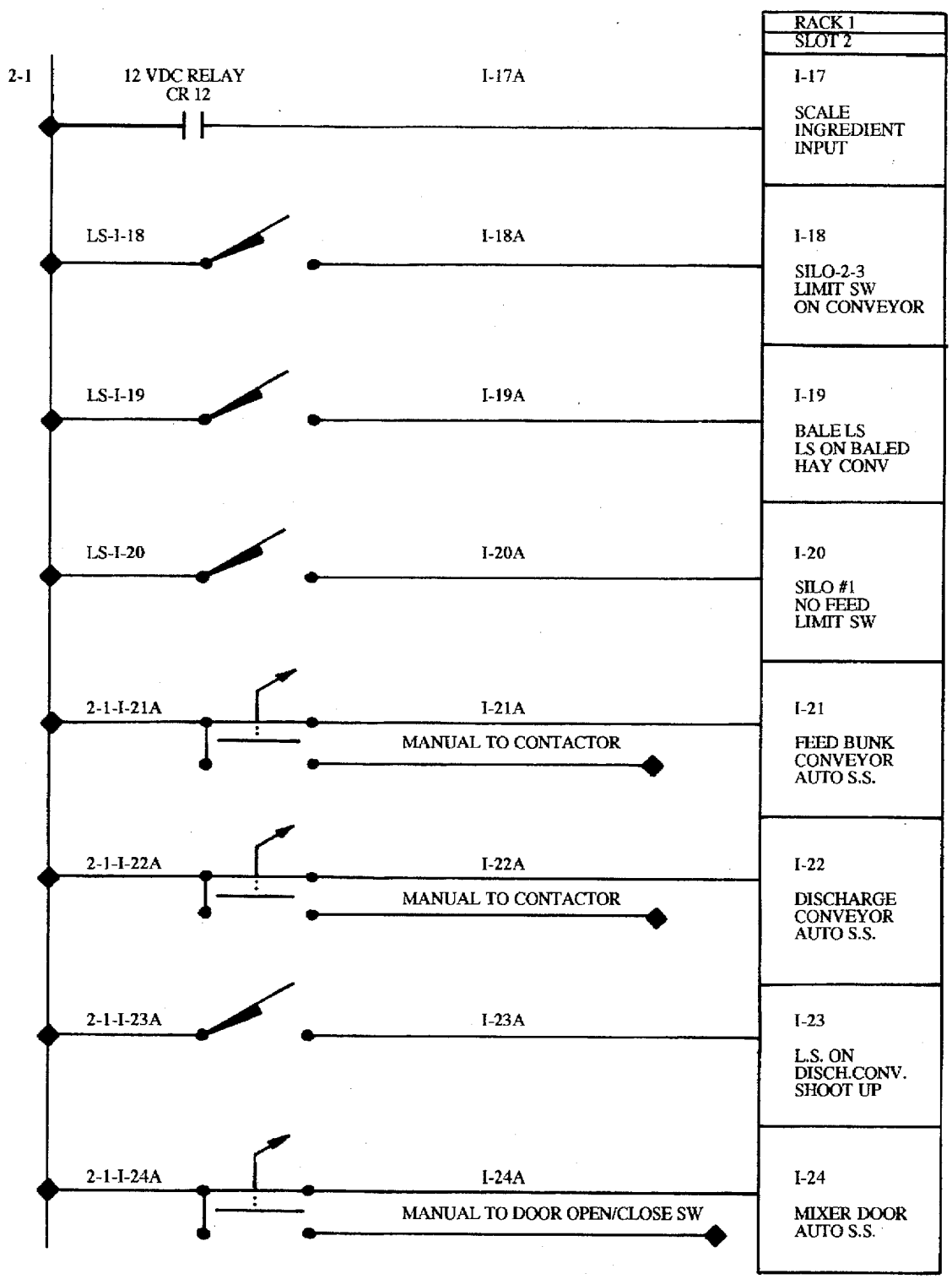
Figure 16:
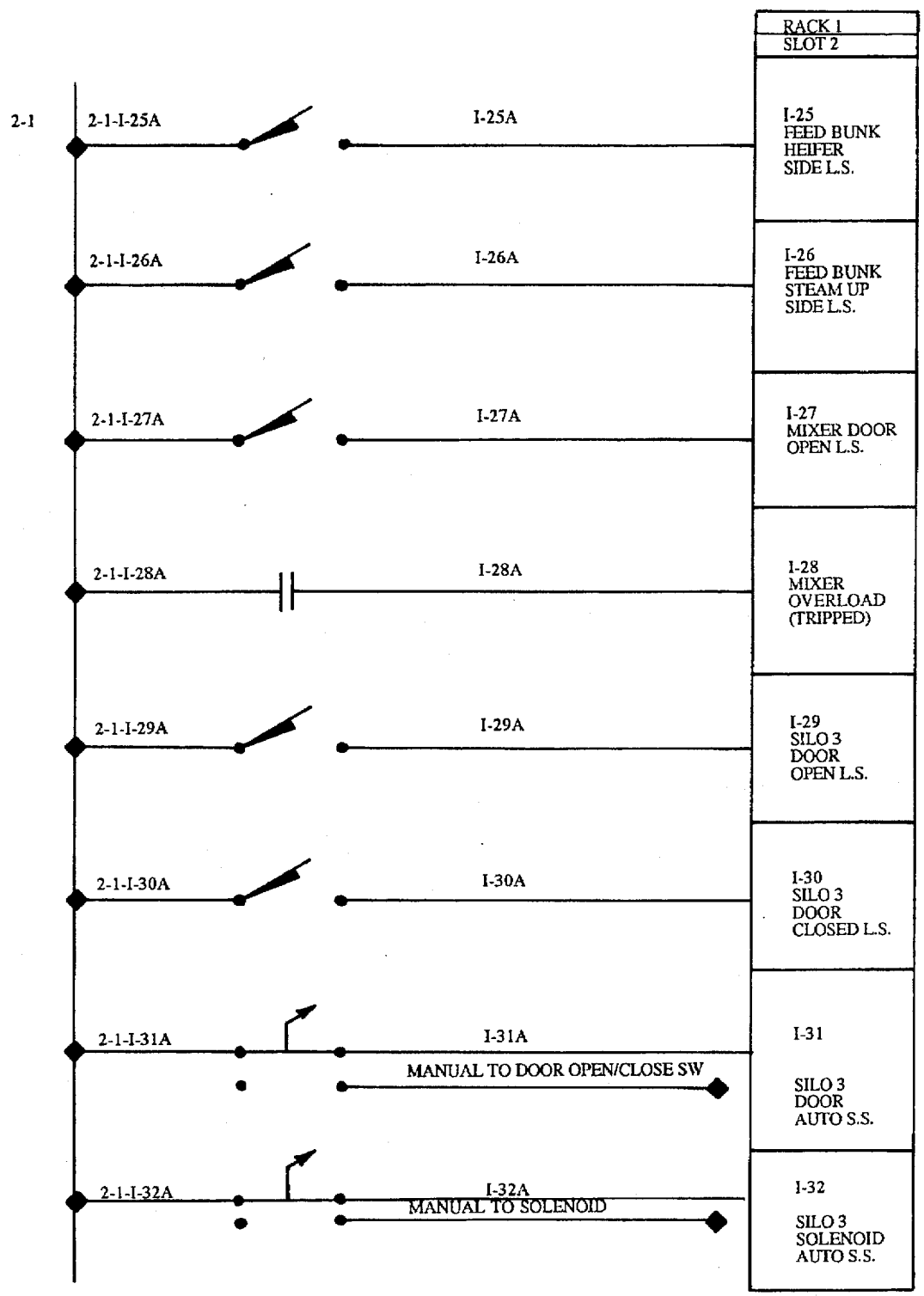
Figure 17:
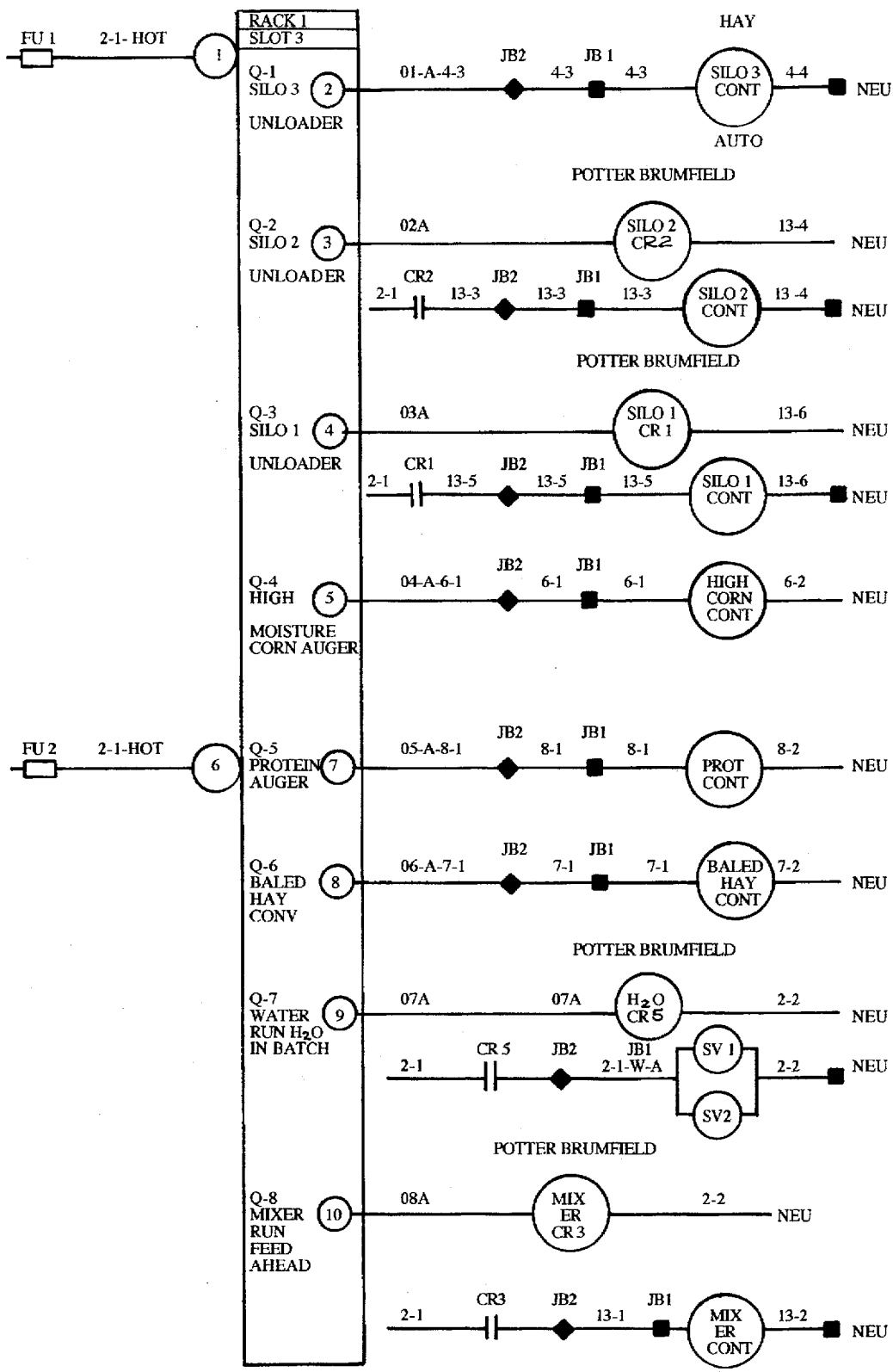
Figure 18:
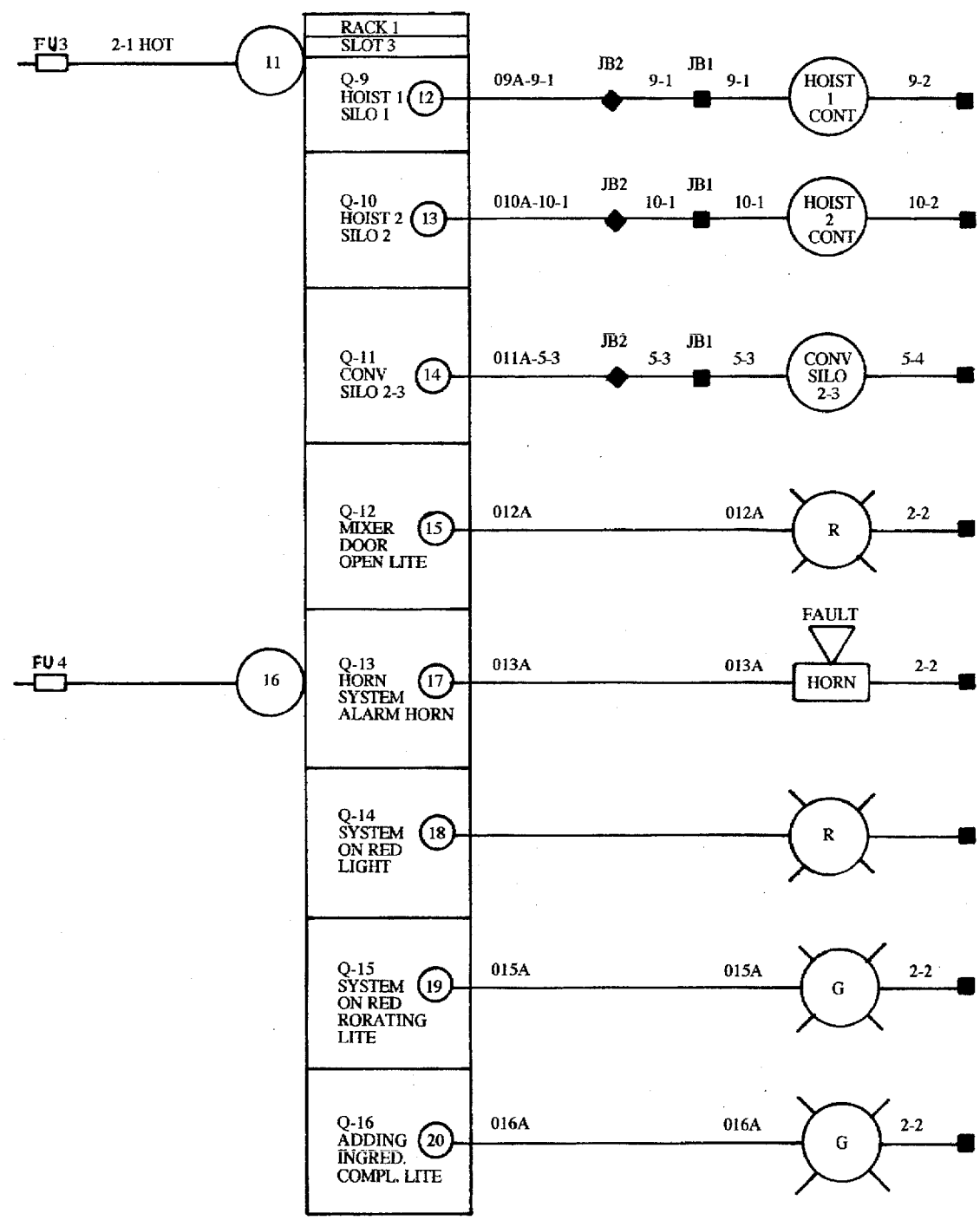
Figure 19:
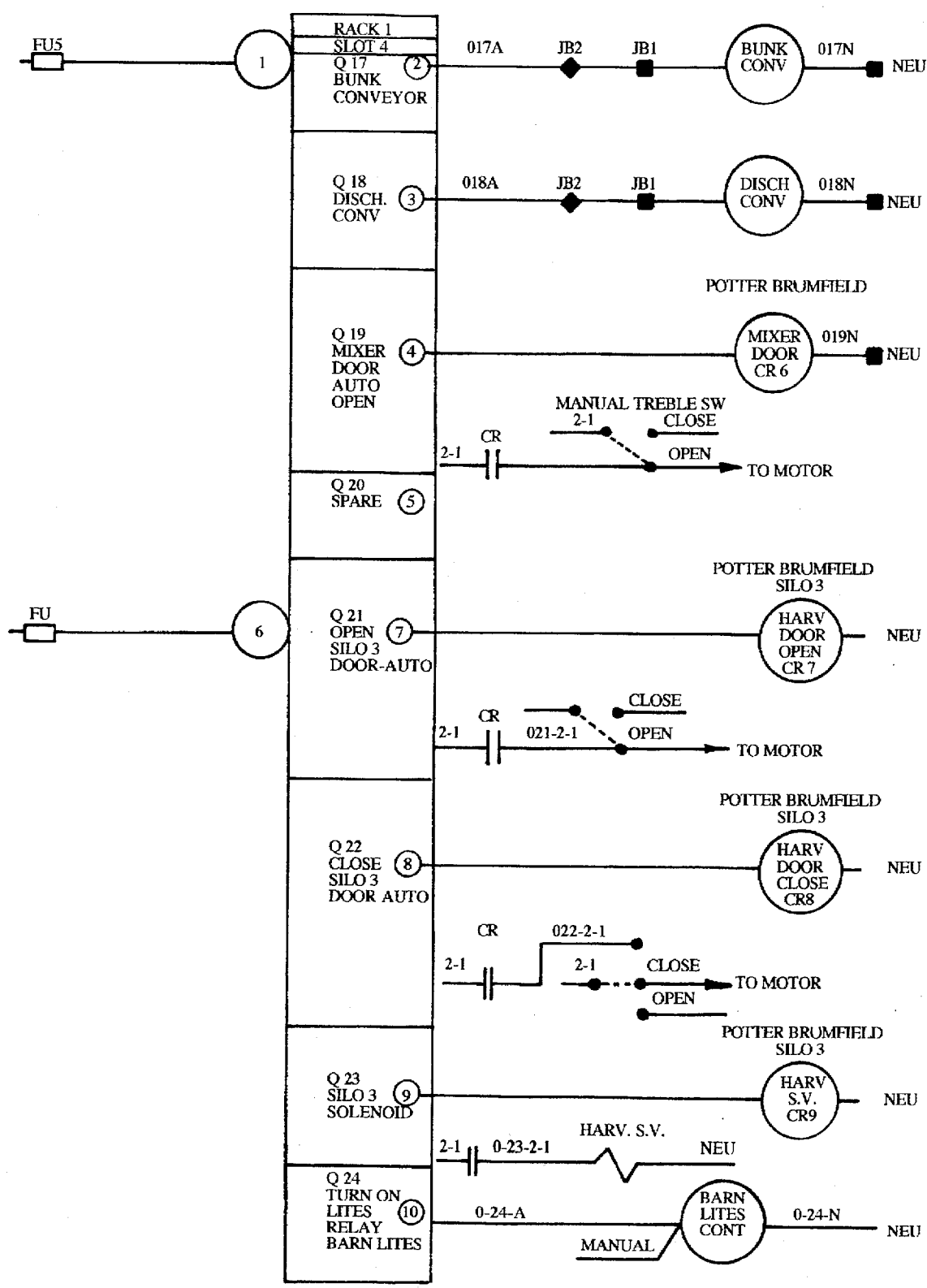
Figure 20:
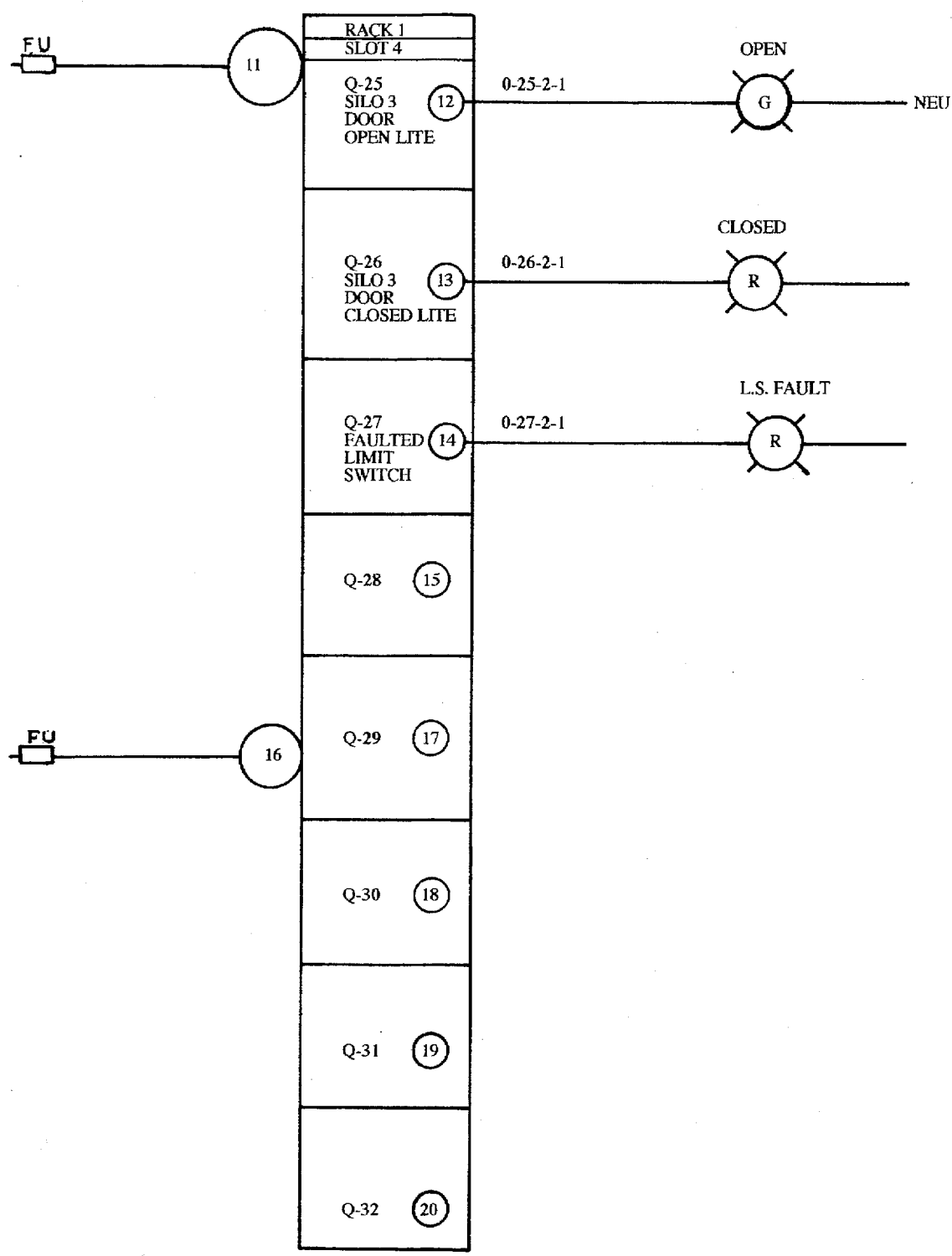
Figure 21:
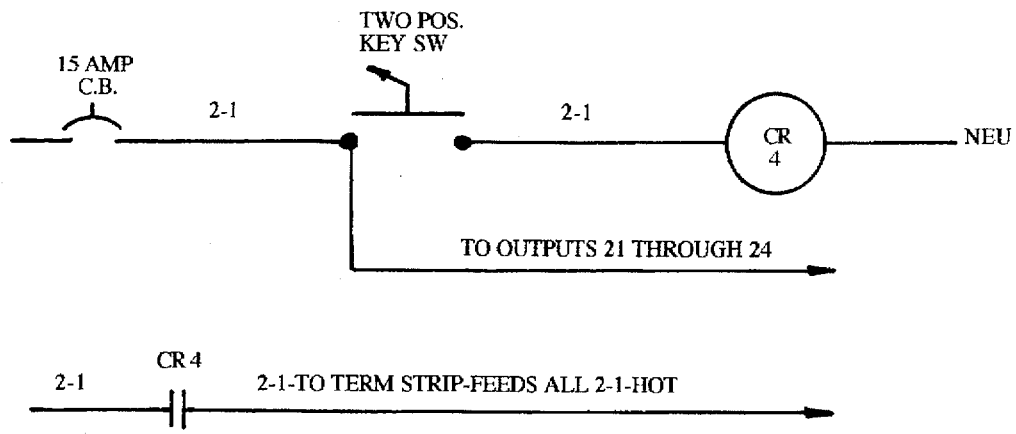
Figure 22:
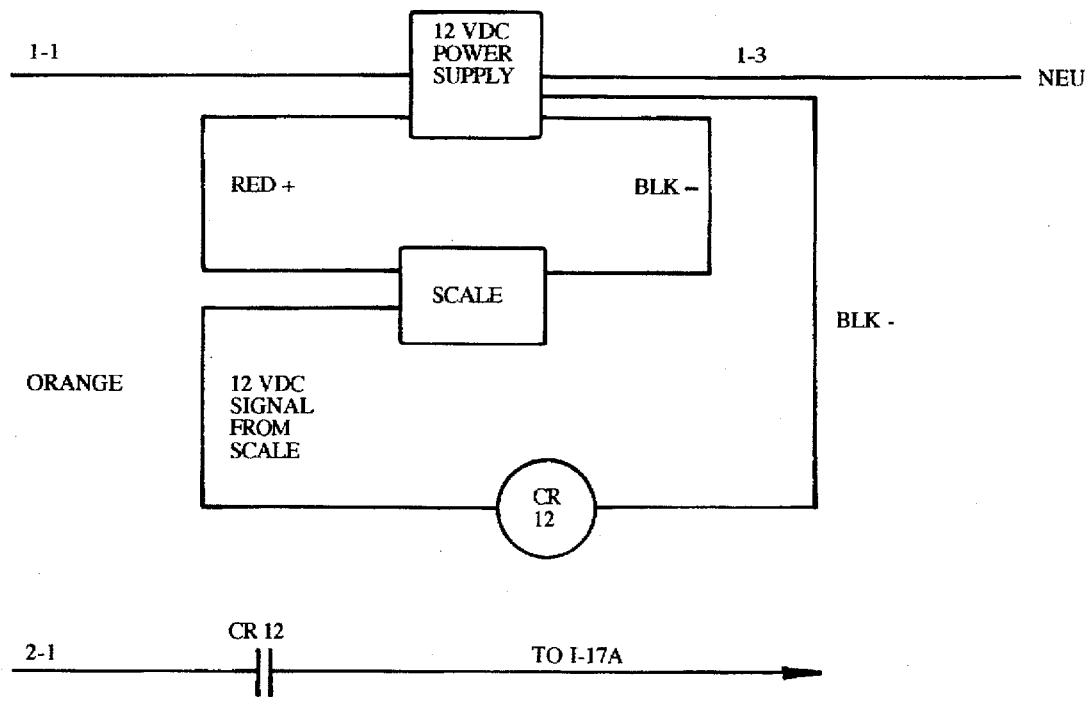
Figures 23, 23A:
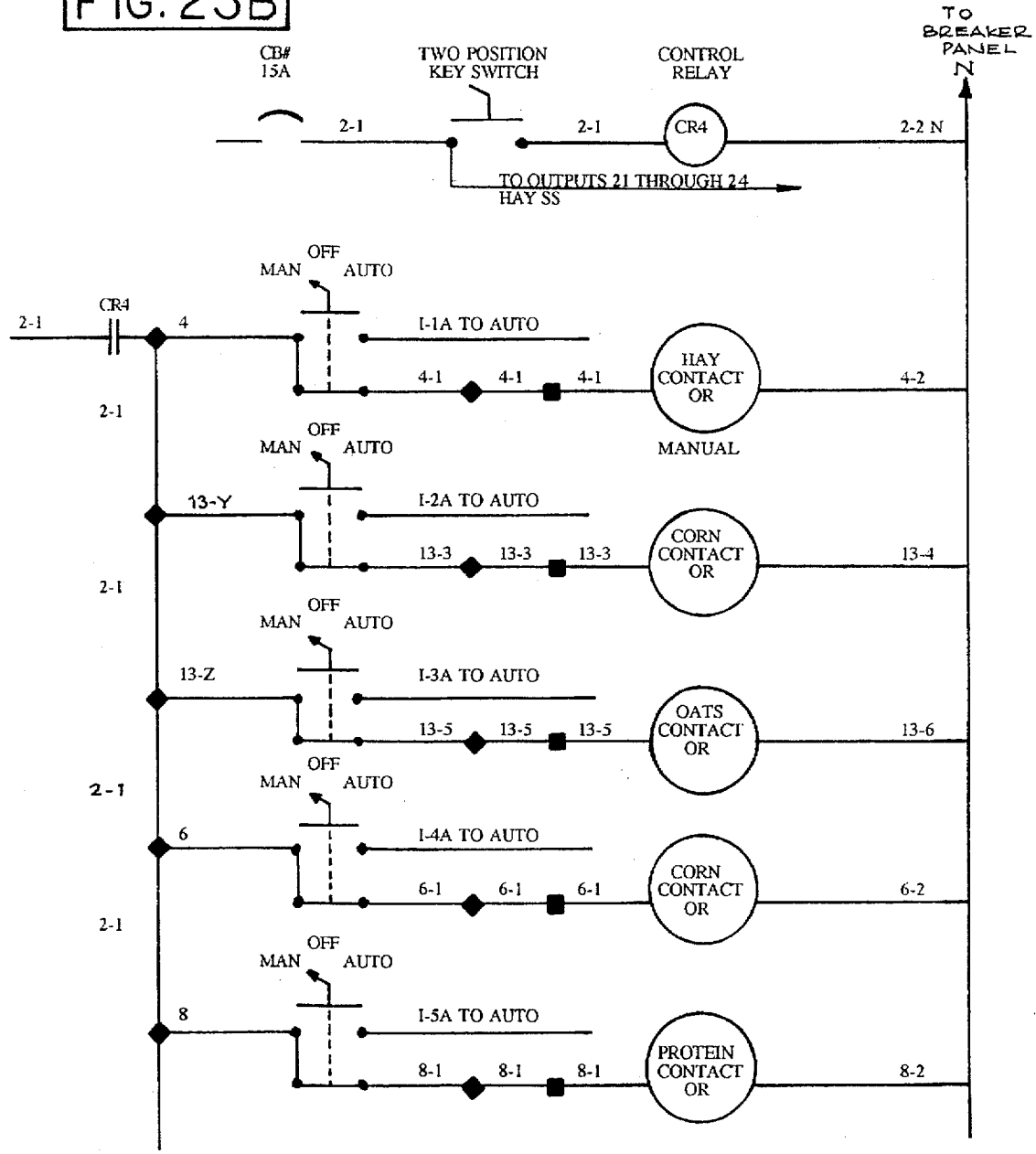
Figure 23B:
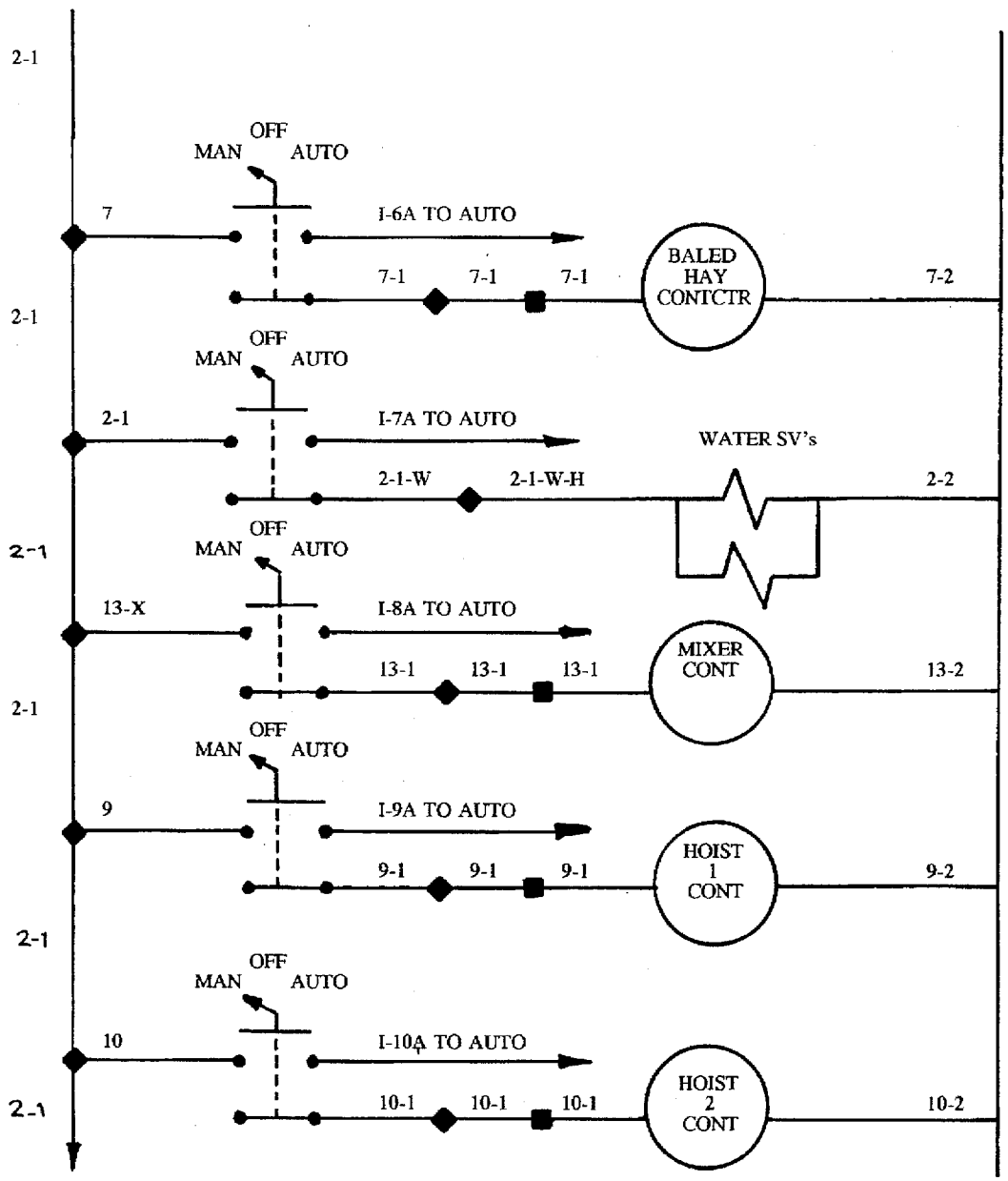
Figure 24A:
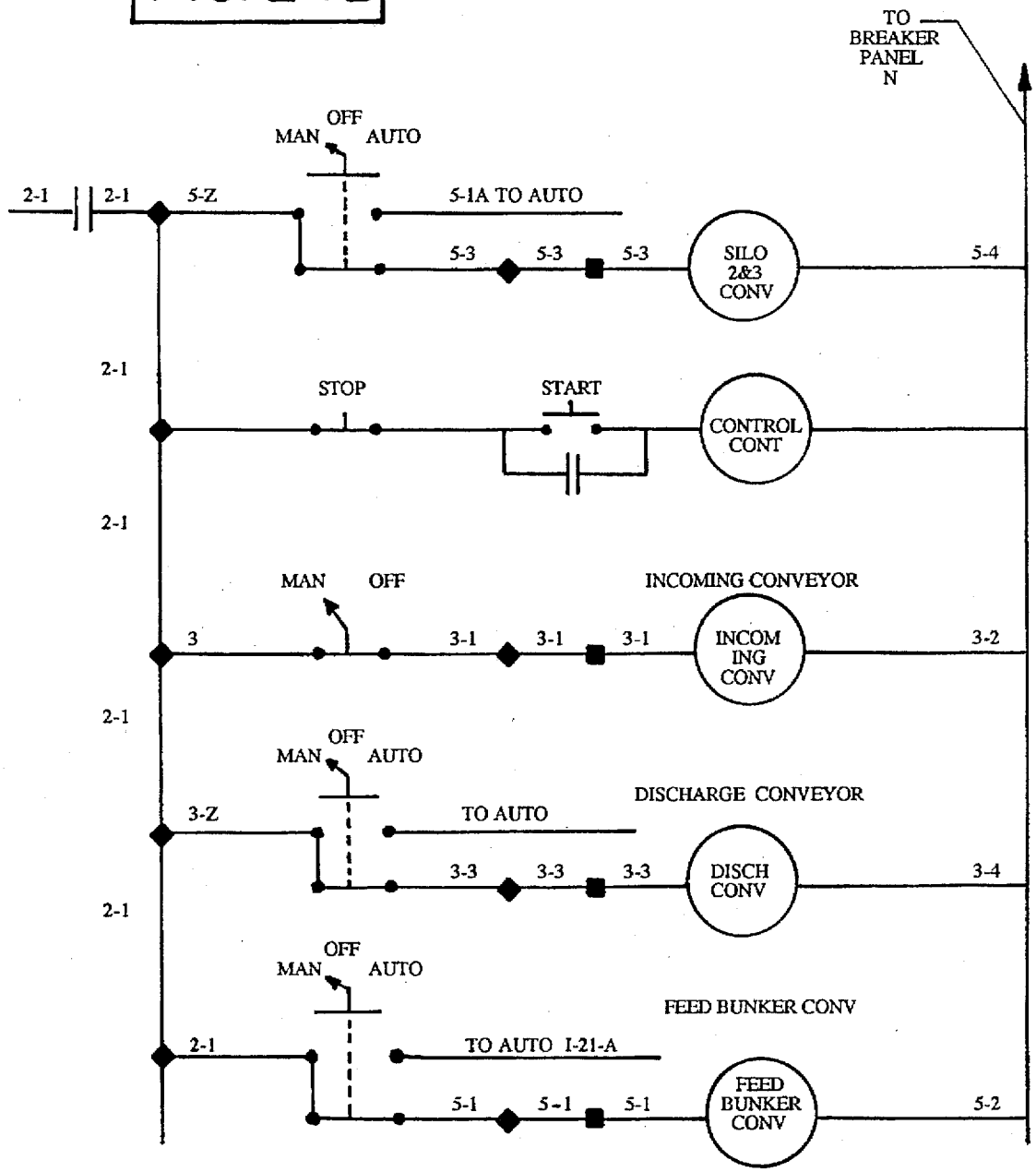
Figure 24B:
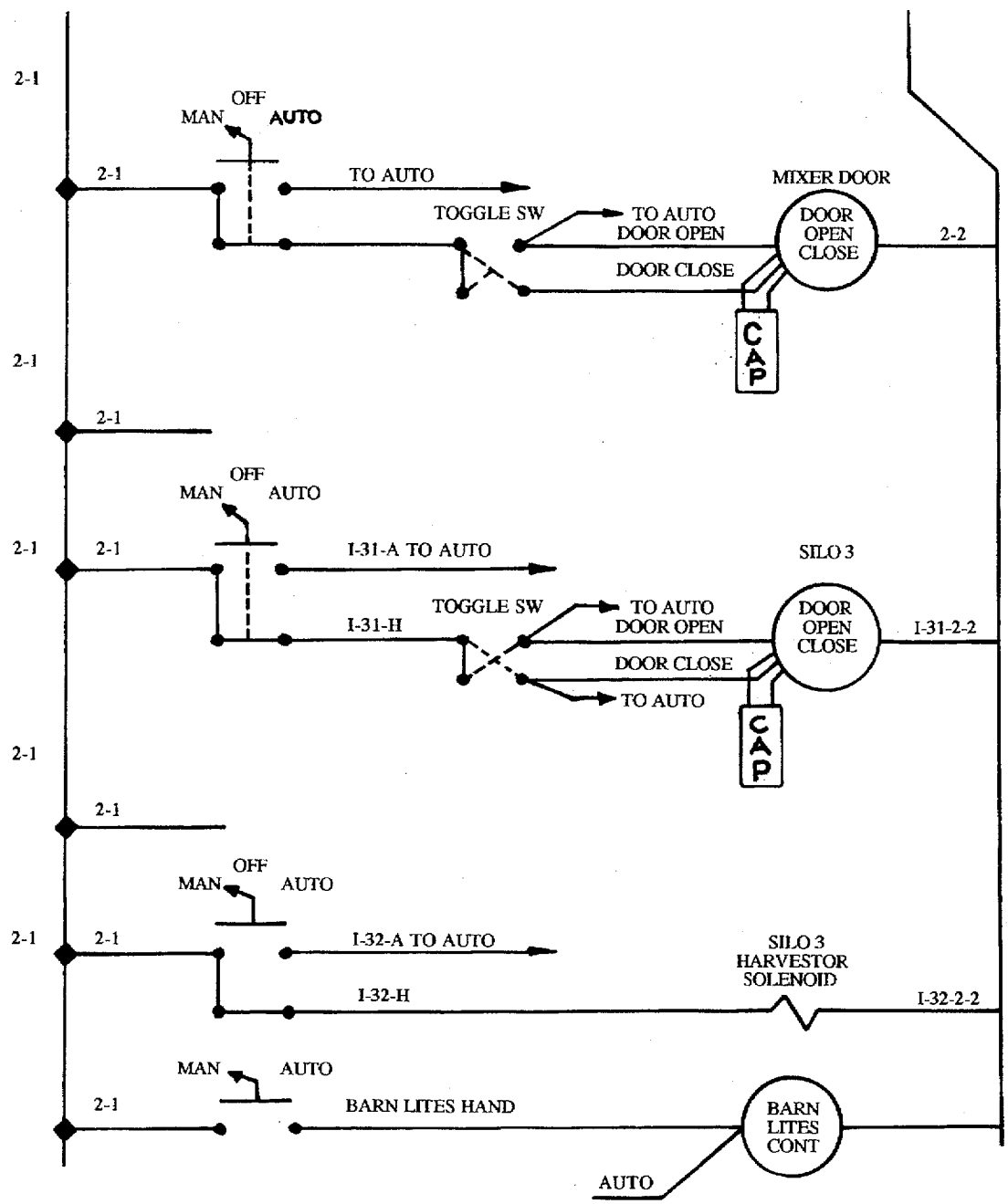
Figure 25:
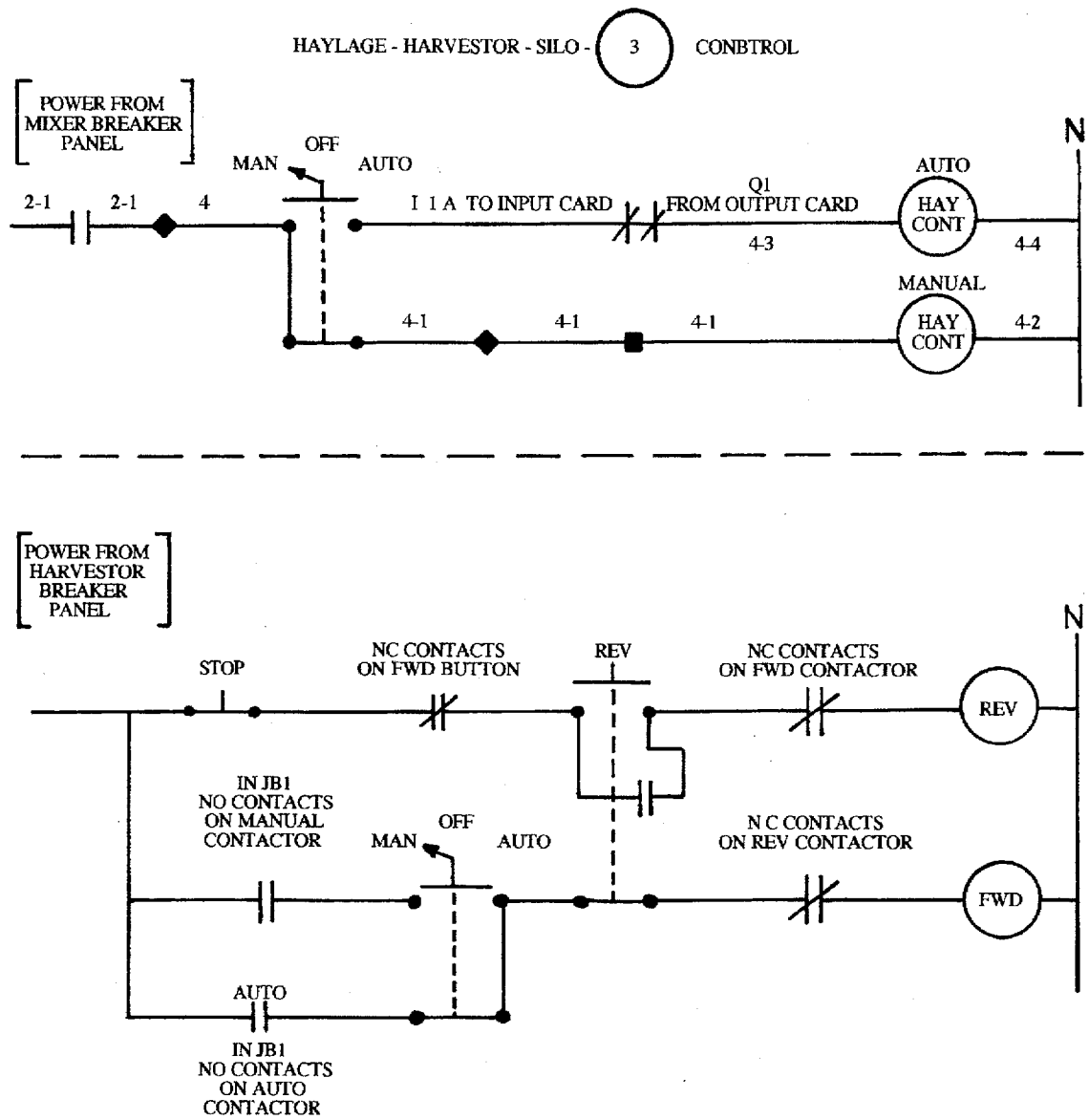

The door handle 260 is best shown in FIGS. 10, 11, and 12. Referring specifically to FIG. 10, the door handle 260 includes a lever end 262 having an opening 264, a pivot point or opening 266, and a cammed edge 268 located opposite the lever end 262. The body 261 of door handle 260 is flat and generally L-shaped. The cammed edge 268 is formed by welding a strip of flat iron to the body 261. The strip is formed in a generally arced or semi-circular segment 270 followed by a straight segment 272 as shown in FIG. 10.

The correct arced segment 270 is formed by first locating point A at the inner corner of flat body 261. Point A is shown in FIG. 10. A 5¾ inch arc, centered at point A, is drawn from point D, which is located directly above point A downward. Again from point A, a 5½ inch arc is drawn starting at point E to point C. Next, a third arc is drawn from point A, this arc has a radius of 5¼ inches and is drawn from point F to point G. Point B is established one inch above point A and ⅛ inch over from point A. From point B, a 5½ inch arc is drawn from point C to point H. Again from point B, a 5¼ inch arc is drawn from point G to point I. These arcs defined the semi-circular portion 270 of cammed edge 268.

Figure 4:
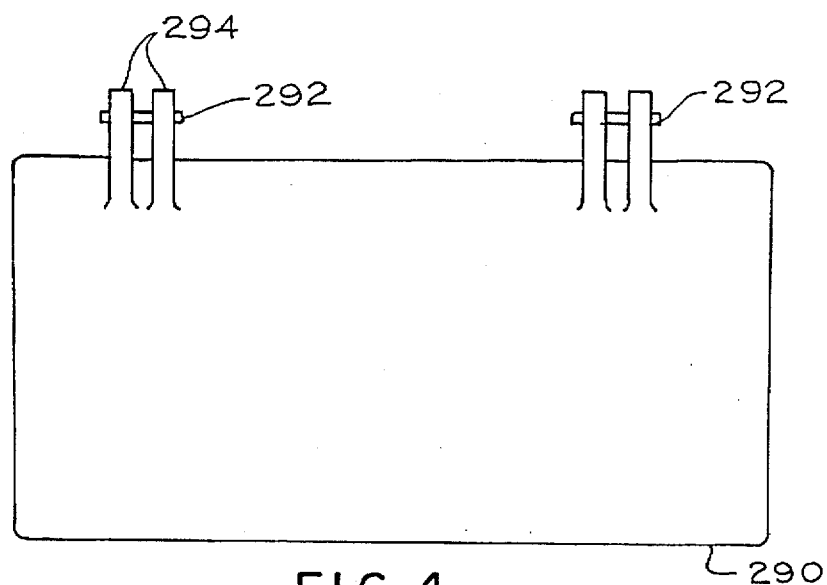
FIG. 4 is a front view of the harvester door.
Figure 5:
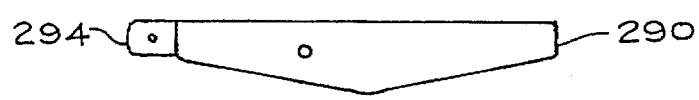
FIG. 5 is a side view of the harvester door.
Figure 6:
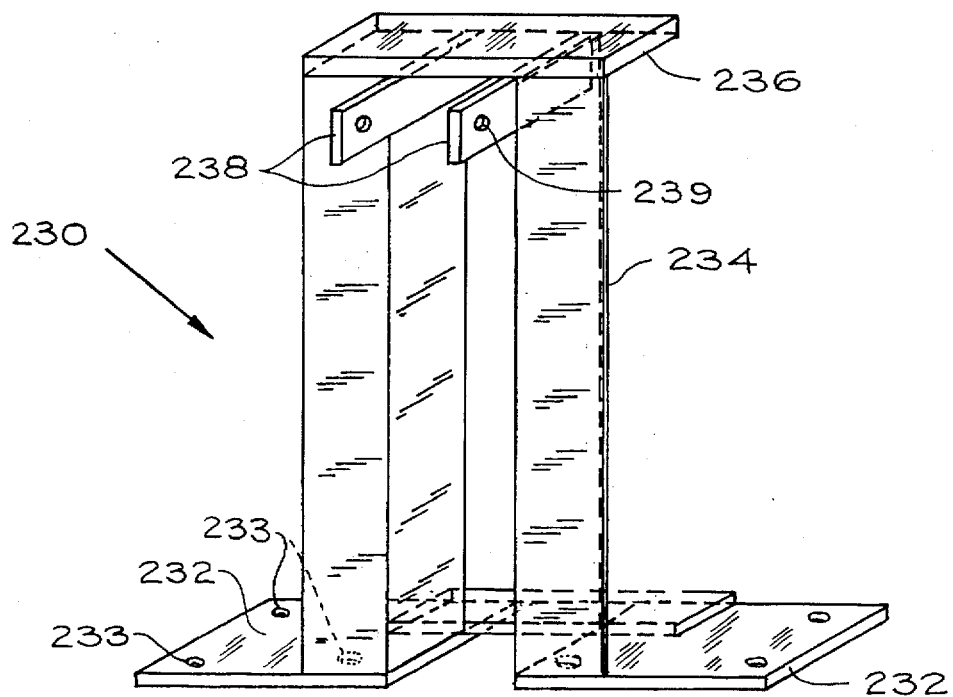
FIG. 6 is a perspective view of the ram support.

The operation of the silo harvester door opening mechanism can best be seen in FIGS. 11 and 12. In each figure, the silo chute or unloader feed exit 32 is shown. A pin 280 is attached to each side of the chute 32 near its exit and at an approximate midpoint between its top and bottom. The door brackets 260 are pivotally attached to the harvester door 290 at pivot opening 266. A front view of the harvester door is shown in FIG. 4 and a side view is shown in FIG. 5. The door 290 swings from the silo on pins 292 which pass through each pair of door supports 294 and tabs which are mounted to the silo and fit between each pair of door supports 294.

The pin 280 is located within cammed edge 268 as shown in FIGS. 11 and 12. FIG. 12 shows the harvester door 290 in its open position. To close the door 290, motor 210 is energized which in turn extends screw jack ram 224 from screw jack housing 222. This pushes horizontal bar 240 downward which in turn pulls threaded rods 250 downward. As lever end 262 of door handle 260 is likewise drawn downward by rod clevises 252, pin 280 engages the inner surface of the semi-circular or arced portion 270 of cammed edge 268. The engagement of pin 280 with cammed edge 268 biases harvester door 290 into its closed position as shown in FIG. 11. Solenoid 300 is a release solenoid for the ratcheting device 308 on the harvester door 290 unloader. Solenoid 300 is used to prevent too much pull on the ratcheting device 308. Solenoid 300 can be set by the PLC 180 to pull out the ratcheting pin 306 for any set time.

Two additional concrete silos or supply means 30 and 40 are also provided. Silo 30 contains oatlage and silo 40 contains corn. The silos have chutes or outputs 32 and 42 respectively at their sides. The doors 34 and 44 are connected to the PLC 180 by wires 56 and 46 respectively. A conveyor 60 is provided to transport the corn silage or haylage or both to mixer 20. The conveyor 60 is also connected to and electronically controlled by the PLC 180 by means of wire 62 so that the desired amount of corn or hay is added to the mixing structure 26 at the proper time.

Protein is stored in a tank 70 also located further from feed mixer 20. The protein is dispensed into feed mixer 20 by means of a supply tube 72. Supply tube motor 74 is controlled by and connected to the PLC 180 by wire 76 to open and close at the proper time in order to supply the required amount of protein to the feed being mixed. Water is added to the mixture by supply pipe 80, also shown in FIG. 1. Supply pipe 80 has an output 82 to which an electronic valve 84 is attached for controlling the amount of water added to the mixture. The valve is similarly connected to the PLC 180 by a wire 86 from which it receives electronic signals for opening and closing at the proper time.

A baled hay elevator 90 is provided to carry hay bales from a remote location, such as a hayloft in a nearby barn, to the feed mixer 20. The elevator also has an output 92 and a control means 94. The control means 94 is connected to the computer or PLC 180 by wire 96 which operates the conveyor.

Additional high moisture corn is supplied to feed mixer 20 by means of a flexible auger 100 having an auger output 102. The flex auger 100 is capable of picking up corn from a bin at a remote location and carrying it through its tubular structure to the top of the mixer 20. The drive means 104 of the flexible auger 100 is similarly connected to and controlled by the PLC 180 by wire 106.

Additionally, a conveyor 110 having a conveyor output 112 is provided for adding any additional ingredients to the feed mixture. The convey 110 is driven by a conveyor motor 116, the conveyor motor 116 controlled by a conveyor control means 114. The conveyor control means 114 is connected to and controlled by the PLC 180 by wire 118.

Each feed ingredient supply means 30, 40, 50, 70, 80, 90, 100 and 110 has an output 32, 42, 52, 72, 82, 92, 102, and 112. Each output includes a control means 34, 44, 54, 74, 84, 94, 104, 112 for controlling the amount of feed discharged from its respective supply means. Each control means is connected to the PLC 180 by means of a wire and is capable of receiving an output command generated by the PLC 180 and sent to the selected control means. Furthermore, the mixing means 28 has a control means 29 connected to the PLC 180 by wire 27 and capable of receiving an output command generated by the PLC 180. The discharge conveyor 120 also has a control means 122 connected to and for receiving discharge control commands from the PLC 180 by wire 124. Finally, the scale 18, which is likewise connected to the PLC 180, has an output connected to the PLC 180 information input and an input for resetting. If the PLC 180 gives the proper command, the scale 18 output is re-set to zero.

The mixing system 10 works as follows. The PLC 180 or computer control system controls all aspects of feed mixing. The only input the feed mixing system 10 needs is the specific amount of each ingredient by weight to be mixed into the feed. After the weight amounts of ingredients have been programmed into the scale, the operator needs only to press the start button at the PLC 180 for mixing to begin. The PLC 180 is connected to and works in combination with the electronic scale 18, automated silo doors 200, 44 and 54 ingredient tubes 72, 80, and 100 and delivery conveyors 60, 90, and 180 to deposit ingredients into the mixer 20 for mixing. The scale 18 measures the amount of ingredient that has been added to the mixture, and when the desired amount has been added the PLC 180 shuts down the delivery means or closes the output means for the specific ingredient. Following each ingredient added step, the PLC automatically advances to the next delivery tube or conveyor which gets readied for the next ingredient. The system 10 is nearly totally automated. The scale 18, the mixing operation, the adding of ingredients, and the operation of conveyors and supply tubes are all controlled by the PLC 180. During the adding of silage ingredients, such as corn silage or hay silage, the mixer 20 alternates on or off in a cycle of one (1) minute on and three (3) minutes off. During the adding of water to the feed mixture the feed mixer 20 mixes constantly. Following the addition of the final ingredient, the mixer 20 mixes the feed for an appropriate amount of time and then stops.

Before and after each stage of ingredient adding, an alarm 190 sounds to let the operator know that a new ingredient is about to be added. No supervision is required. Following shutdown of the mixer 20 after full mixing of all ingredients, the operator may control downloading of the mixed feed from the mixer hopper 26 to smaller hoppers for transfer of the mix to the feeding area or the mixed feed may be automatically conveyed to a heifer feeder 140 or steam up feeder 150 by means of a discharge conveyor 120 and bunker conveyor 130 as shown in FIG. 1.

In the automated distribution mode, once the mixing process has been completed, the discharge door 24 of the feed mixer 20 opens and the mixed feed can be discharged on to discharge conveyor 120. The mixed feed is carried along discharge conveyor 120 and deposited onto feed bunker conveyor 130. The feed bunker conveyor 130 is typically located near ceiling level in the room where the feeding of livestock occurs. From the feed bunker conveyor 130 the feed can be routed into either heifer feeder 140 or steam up feeder 150 in order to feed the livestock located in the respective areas of the barn.

FIGS. 13-25 depict the schematic wiring wiring diagrams for mixing system 10 and its various components.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An apparatus for mixing livestock feed, the apparatus comprising:

a feed mixer having a filling opening and a discharge opening;

a feed mixing means located within the feed mixer;

a plurality of feed ingredient supply means for supplying feed ingredients;

said feed ingredient supply means including at least one silo harvester door;

said plurality of feed ingredient supply means coupled to said feed mixer via a conveyor mechanism;

each feed ingredient supply means having an output and a control means, each control means being attached to each feed ingredient supply means at the output;

an electronic scale having an electronic output, the scale attached to the feed mixer;

a mixed feed discharge means for discharging mixed feed, the discharge means attached to the feed mixer discharge opening;

a programmable logic control mechanism having an information input and a plurality of command outputs, the programmable logic control mechanism programmed to independently open each control means and close each control means;

at least one of the plurality of command outputs being connected to at least one the plurality of feed ingredient supply means;

at least one of the plurality of command outputs being connected to the discharge means;

at least one of the plurality of command outputs being connected to the mixing means;

the information input connected to the scale output;

the programmable logic control mechanism being programmed to add a predetermined weight of at least one feed ingredient and mix the ingredient in the feed mixer;

the feed ingredient supply means outputs comprise at least one chute and the feed ingredient supply means control means comprises said at least one silo harvester door.

2. The apparatus of claim 1 wherein the feed ingredient supply means further includes at least one silo coupled to said at least one silo harvester door.

3. The apparatus of claim 1 wherein said conveyor mechanism includes at least one conveyor located between at least one of said plurality of feed ingredient supply means and the feed mixer for conveying feed ingredients from at least one of said plurality of feed ingredient supply means to the feed mixer filling opening.

* * * * *